United States Patent

Kalkunte et al.

[11] Patent Number: 5,852,723
[45] Date of Patent: Dec. 22, 1998

[54] METHOD AND APPARATUS FOR PRIORITIZING TRAFFIC IN HALF-DUPLEX NETWORKS

[75] Inventors: Mohan Kalkunte, Sunnyvale; Jayant Kadambi, Milpitas; Jim Mangin, San Ramon; Shashank Merchant, Sunnyvale, all of Calif.

[73] Assignee: Advanced Micro Devices, Inc., Sunnyvale, Calif.

[21] Appl. No.: 692,689

[22] Filed: Aug. 6, 1996

[51] Int. Cl.$^6$ ........................................ G06F 13/00
[52] U.S. Cl. ............................ 395/200.65; 370/448
[58] Field of Search ............... 395/200.65; 370/229, 370/237, 416, 418, 454, 455, 459, 447, 448, 461, 462

[56] References Cited

U.S. PATENT DOCUMENTS

| | | | |
|---|---|---|---|
| 4,623,886 | 11/1986 | Livingston | 370/462 |
| 5,319,641 | 6/1994 | Fridrich et al. | 370/447 |
| 5,353,287 | 10/1994 | Kuddes et al. | 370/448 |
| 5,418,784 | 5/1995 | Ramakrishnan et al. | 370/445 |
| 5,436,903 | 7/1995 | Yang et al. | 370/448 |
| 5,453,987 | 9/1995 | Tran | 370/447 |
| 5,526,355 | 6/1996 | Yang et al. | 370/448 |
| 5,568,469 | 10/1996 | Shever et al. | 370/448 |
| 5,568,476 | 10/1996 | Shever et al. | 370/236 |
| 5,600,651 | 2/1997 | Molle | 370/448 |
| 5,650,997 | 7/1997 | Yang et al. | 370/448 |

FOREIGN PATENT DOCUMENTS

| | | |
|---|---|---|
| 0125095 | 11/1984 | European Pat. Off. . |
| 0632620 | 1/1995 | European Pat. Off. . |

OTHER PUBLICATIONS

"ISDN Primary Rate Interface Impact on Performance of Integral Voice and Data", by K. Sohraby and G. P. Austin, IEEE 1990.
"The Ethernet Capture Effect: Analysis and Solution", by K. K. Ramakrishnan and Henry Young, IEEE 1994.
"Solving Capture in Switched Two–node Ethernets by Charging Only One Node" by Wayne Hayes, IEEE 1995.
"Prioritized Protocols for Multi–Bus Local Area Networks", by Zin–Jia Na, Narayan Subramanian, IEEE 1990.
AMD, AM79C970 PCnet™–PCI Single–Chip Ethernet Controller for PCI Local Bus, Jun. 1994, pp. 1–868 — 1–1033.
"Priority Access Control Enabled (PACE™) Technology for High–Duality Real–Time and Multimedia Applications over Today's Ethernet LANs", 3Com White Paper, Stock No. 600164–002, Jul. 1995.

*Primary Examiner*—Moustafa M. Meky

[57] ABSTRACT

Collision delay intervals are modified in Ethernet network devices transmitting priority data requiring a guaranteed latency by multiplying an integer multiple number of slot times with a fractional coefficient. A network device having priority data for transmission uses the conventional Truncated Binary Exponential Backoff (TBEB) algorithm during the first access attempt to calculate a collision delay interval from a randomly selected integer multiple of slot times. If the network device encounters another collision, the next randomly selected integer multiple of slot times is multiplied by the fractional coefficient. Use of the fractional coefficient during collision mediation on a half-duplex Ethernet network provides a bounded access latency for real-time and multimedia applications by granting the network device a higher probability of successfully accessing the network media.

24 Claims, 4 Drawing Sheets

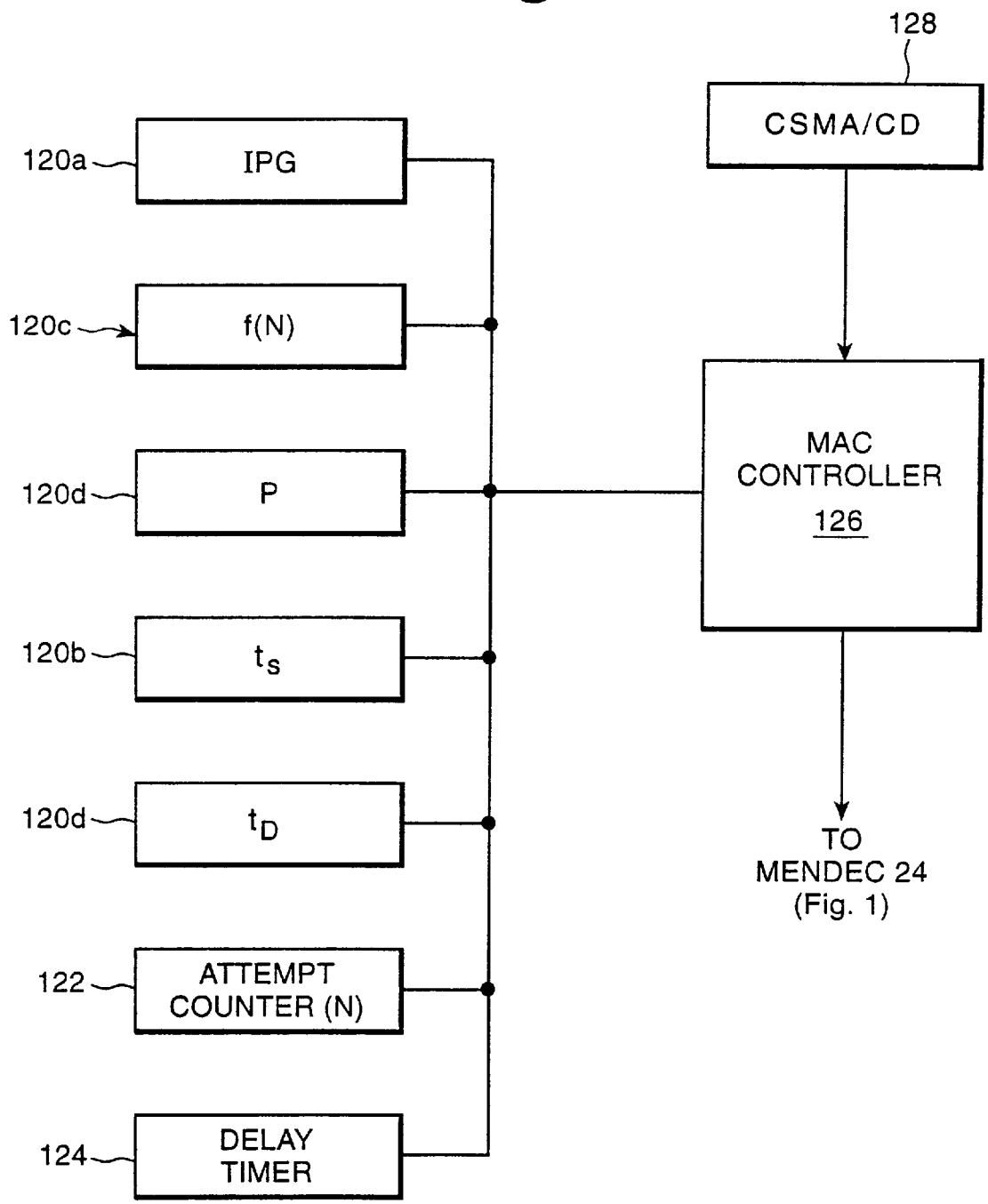

METHOD AND APPARATUS FOR PRIORITIZING TRAFFIC IN HALF-DUPLEX NETWORKS

FIELD OF THE INVENTION

The present invention relates to network interfacing and more particularly, to methods and systems efficiently accessing Ethernet media.

DESCRIPTION OF THE RELATED ART

Local area networks use a network cable or other media to link stations on the network. Each local area network architecture uses a media access control (MAC) enabling network interface cards at each station to share access to the media.

The Ethernet protocol ISO/IEC 8802-3 (ANSI/IEEE Std. 802.3, 1993 edition) defines a half-duplex media access mechanism that permits all stations to access the network channel with equality. Hence, traffic is not distinguished or prioritized over the medium. Each station includes an Ethernet interface card that uses carrier-sense multiple-access with collision detection (CSMA/CD) to listen for traffic on the media. Transmission by a station begins after sensing a deassertion of a receive carrier on the media, indicating no network traffic. After starting transmission, a transmitting station will monitor the media to determine if there has been a collision due to another station sending data at the same time. If a collision is detected, both stations stop, wait a random amount of time, and retry transmission.

Any station can attempt to contend for the channel by waiting a predetermined time after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision.

Ethernet networks mediate collisions by using a truncated binary exponential backoff (TBEB) algorithm, which provides a controlled pseudorandom mechanism to enforce a collision backoff interval before retransmission is attempted. According to the truncated binary exponential backoff algorithm, a station keeps track of the number of transmission attempts (j) during the transmission of a current frame. The station computes a collision backoff interval as a randomized integer multiple of a slot time interval, and attempts retransmission after the collision backoff interval. The station will attempt to transmit under the truncated binary exponential algorithm a maximum of sixteen times.

The collision backoff interval is calculated by selecting a random number of time slots from the range of zero to $2^j-1$. For example, if the number of attempts j=3, then the range of randomly selected time slots is (0,7); if the randomly-selected number of time slots is four, then the collision backoff interval will be equal to four slot time intervals. According to Ethernet protocol, the maximum range of randomly selected time slots is $2^{10}-1$.

Although collision mediation enables stations in a half-duplex network to contend for the media, collision mediation reduces the network throughput and creates unbounded packet access latencies. Consequently, applications requiring bounded access latencies such as interactive multimedia cannot be supported on such half-duplex networks.

Although a proposal has been made for enabling a station to have high priority over all other traffic on the medium (referred to as Priority Access Control Enabled), the proposal requires use of a switched hub. Hence, there has not been any disclosure of an arrangement for prioritizing traffic in a half-duplex Ethernet network.

DISCLOSURE OF THE INVENTION

There is a need for a method of mediating collisions in a network that provides a bounded access latency for high priority traffic.

There is also a need for a method of accessing media of a network that maintains quality of service for a network station.

These and other needs are attained by the present invention, where the slot time interval between sensing a collision on the media and attempting access of the media is reduced for high priority traffic requiring a guaranteed latency.

According to one aspect of the present invention, a method in a network station of mediating collisions on a network media includes the steps of sensing a collision on the media, determining a priority of data to be transmitted by the network station, determining a slot time interval by multiplying a predetermined delay interval by (1) an integer randomly selected from a range of integers calculated from an exponential number of access attempts by the network station and (2) a priority coefficient having a value corresponding to the determined priority, and attempting access of the media in response to the detected collision and after the slot time interval. The use of a priority coefficient enables a network station to modulate the slot time interval to transmit data packets having a high priority. Hence, traffic on the network media may be prioritized by reducing the slot time interval.

Another aspect of the present invention provides a network interface for connection with a network media, comprising a buffer storing data having an identified priority for transmission on the media, a collision sensor sensing a collision on the media, a delay time calculator selectively calculating a delay time in response to a number of access attempts by the network interface and the identified priority, and a media access device attempting access of the media in response to the sensed collision of the media and after the delay time. The network interface can selectively calculate the delay time, depending on the identified priority and the number of access attempts. Hence, if the network interface attempting to transmit priority data encounters a number of collisions, the network interface may modify the delay time calculation to increase the probability of successful transmission.

Still another aspect of the present invention provides a method of limiting access latency during data transmission in a network station, comprising sensing a collision on a network media, determining a delay time by randomly selecting between zero and a predetermined slot time if a number of access attempts is one, determining the delay time by (1) randomly selecting an integer, (2) multiplying the selected integer with the predetermined slot time, and (3) multiplying the selected integer multiple of slot times with a coefficient corresponding to an access latency variability if the number of access attempts is greater than one, and attempting access of the media in response to the detected collision and after the determined delay time. The method of determining the delay time ensures that data requiring a bounded access latency is transmitted on the network media within a specified access latency variability. Hence, data requiring a low level of variability will have a lower delay time to increase the probability that the network station wins the collision mediation. Hence, a network station can support a desired quality of service on a half-duplex network for data requiring a guaranteed bandwidth, a bounded access latency, and a limited variance in delay (i.e., jitter).

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein:

FIG. 3 is a block diagram of the media access control (MAC) of FIG. 1.

BEST MODE FOR CARRYING OUT THE INVENTION

Figure 1:
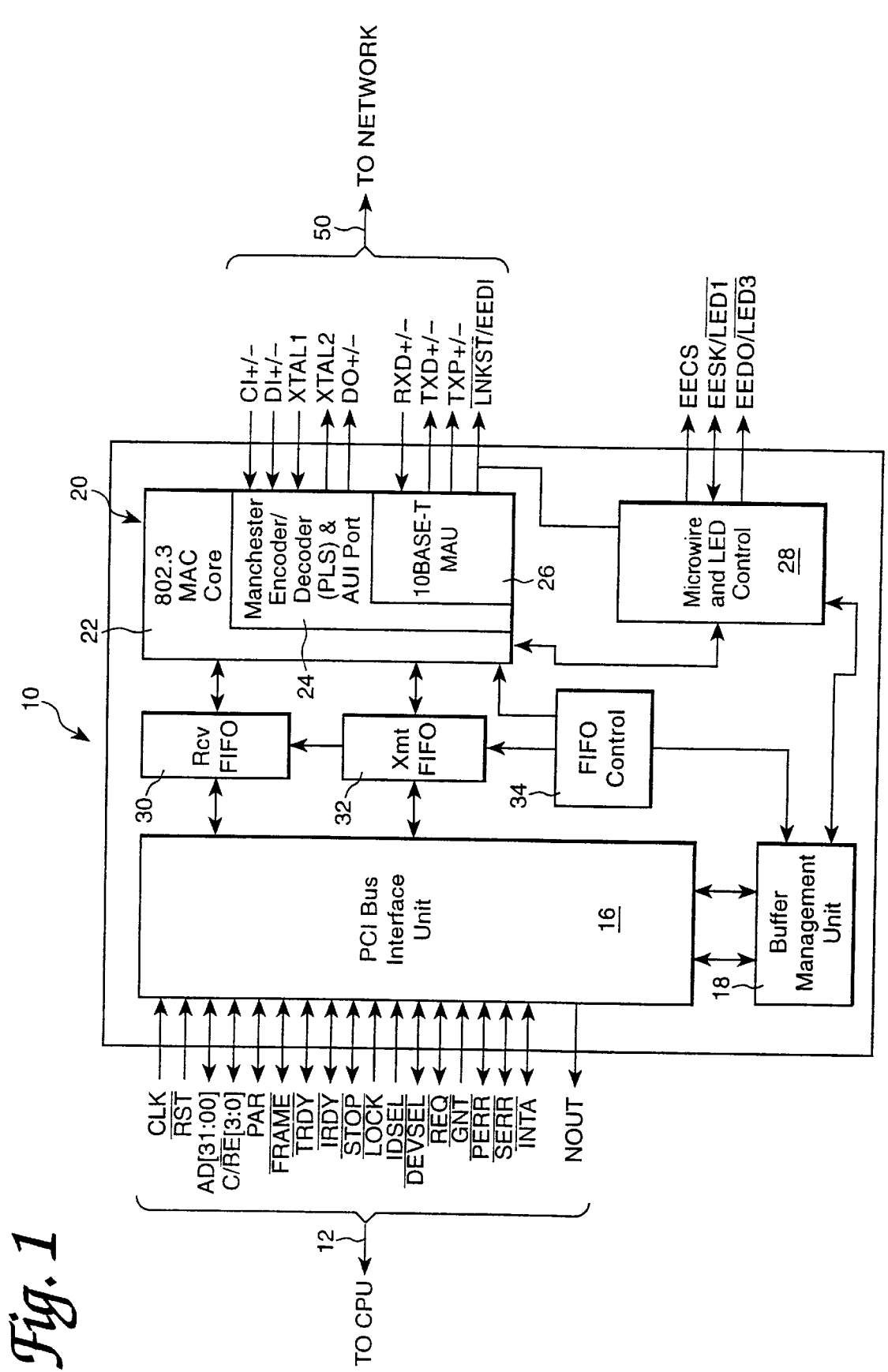
FIG. 1 is a block diagram of a network interface according to an embodiment of the present invention.

FIG. 1 is a block diagram of an exemplary network interface 10 that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the commercially available Am79C970 PCnet™—PCI Single-Chip Ethernet Controller for PCI Local Bus from Advanced Micro Devices, Inc., Sunnyvale, Calif., disclosed on pages 1–868 to 1–1033 of the AMD Ethernet/IEEE 802.3 Family 1994 World Network Data Book/Handbook, the disclosure of which is incorporated in its entirety by reference.

The interface 10 includes a PCI bus interface unit 16, a direct memory access (DMA) buffer management unit 18, and a network interface portion 20 including a media access control (MAC) core 22, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The interface 10 also includes a microwire EEPROM interface 28, a receive first in first out (FIFO) buffer 30, a transmit FIFO buffer 32, and a FIFO controller 34.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU via the PCI bus 12. The data frames received from the PCI bus interface unit 16 are passed on a byte-by-byte basis to the transmit FIFO 32.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The Manchester encoder and attachment unit interface (AUI) 24 includes a Collision In (CI+/−) differential input pair, operating at pseudo ECL levels, that signals to the network interface 10 when a collision has been detected on the network media. A collision occurs when the CI inputs are driven with a 10 MHz pattern of sufficient amplitude and pulse width that meets the ISO/IEC 8802-3 (ANSI/IEEE 802.3) standards. The Data Out (DO+/−) output pair of the AUI 24 transmits Manchester encoded data at pseudo ECL levels onto the network media 50. Similarly, the twisted pair interface 26 includes 10BASE-T port differential receivers (RXD+/−) and 10BASE-T port differential drivers (TXD+/−).

The media access control (MAC) 20 performs the CSMA/CD functions in response to signals from the interfaces 24 or 26. For example, carrier sense is detected by the DI and RXD signal paths of the AUI port 24 and MAU 26, respectively. The AUI 24 detects a collision by the CI inputs, and the MAU 26 detects a collision by sensing activity on both twisted pair signals RXD and TXD. Additional functions of the MAC 20 are described below.

The media 50 may be either coaxial, fiber optic, or twisted pair wire, and hence may couple the interface 10 to 10BASE-T, 10BASE-2, 100BASE-TX, 100BASE-T4, or 100BASE-FX networks. The network may operate at 10 megabits per second (10 Mbit/s), 100 megabits per second (100 Mbit/s), or 1000 megabits per second (1000 Mbit/s).

Figure 2A:
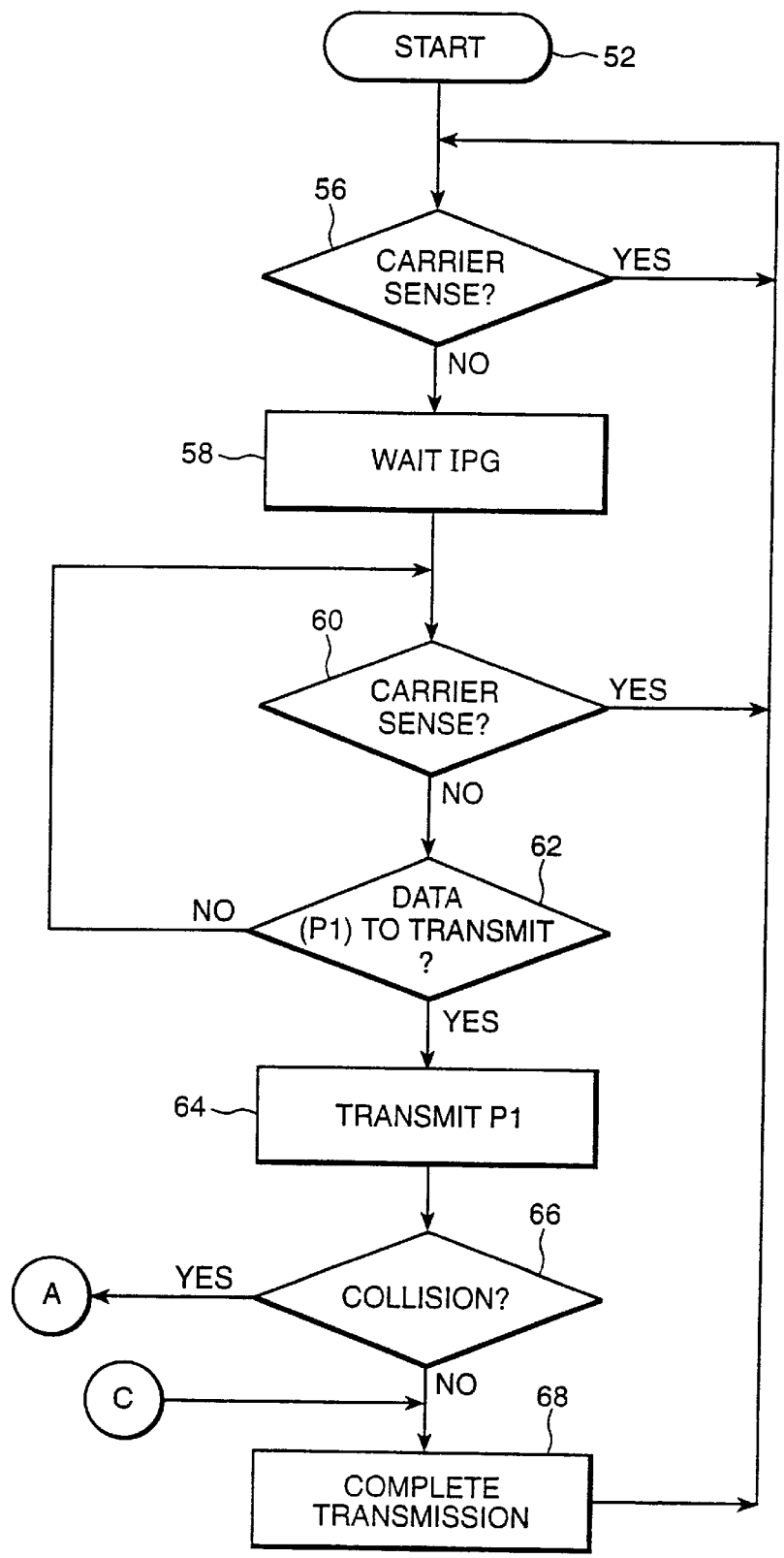
FIGS. 2A and 2B are flow diagrams of the method for accessing media of the network according to the present invention.
Figure 2B:
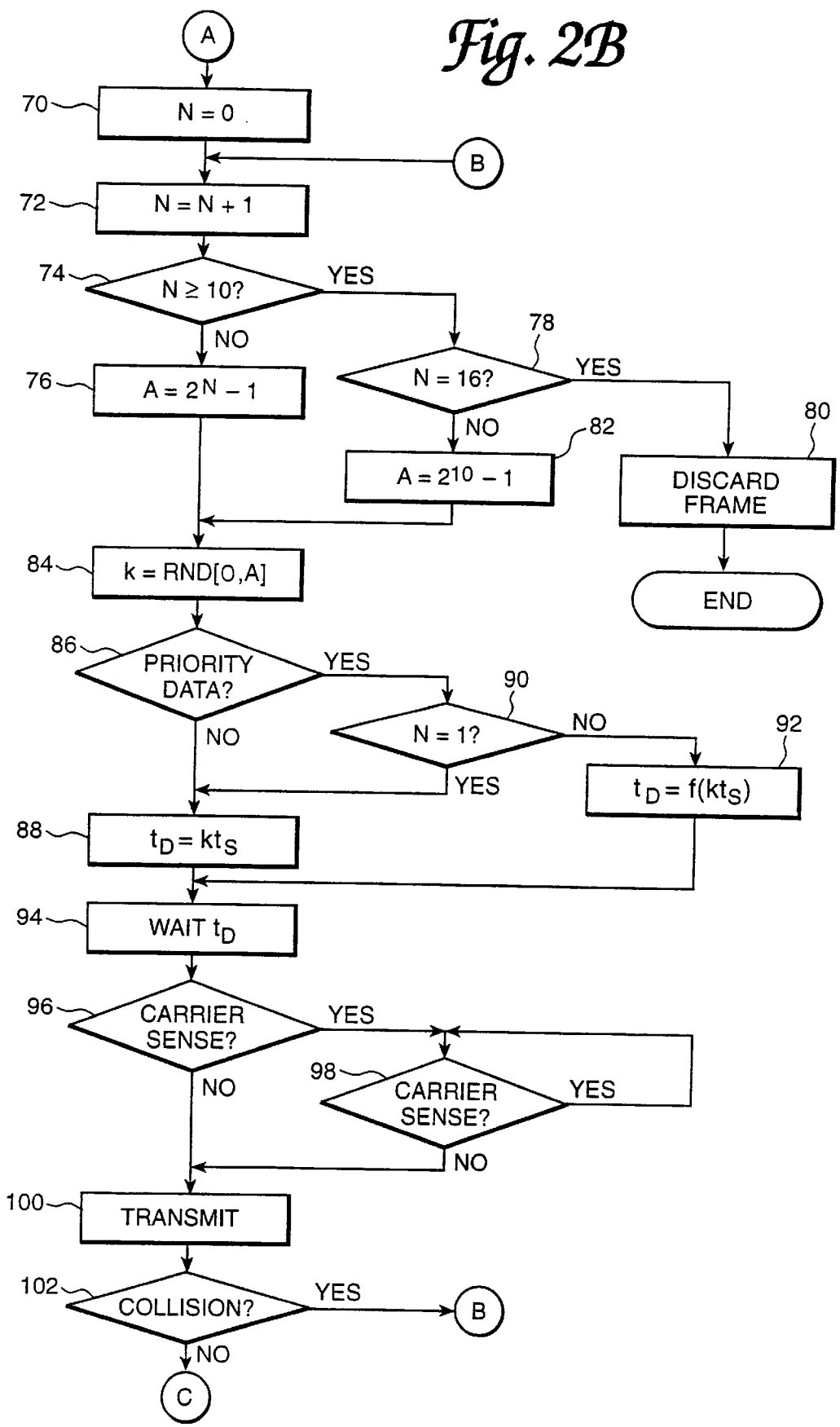

FIGS. 2A and 2B are flow diagrams summarizing the method by a network station having the network interface 10 for accessing the media 50 of an Ethernet network. The method of the present invention can be implemented by embedding executable code within a memory element in the MAC 22 (e.g., register, EPROM, EEPROM, flash memory).

The media access controller (MAC) 22 in the network interface 10 starts in step 52, during which point the Ethernet media 50 is busy with transmission activity by a station. The MAC 22 then checks in step 56 if a receive carrier is sensed on the media 50 using the CSMA/CD, indicating that the network is busy. If the receive carrier is sensed, the MAC 22 waits in step 56 until deassertion of the receive carrier on the media 50 is detected. The MAC 22 starts a delay timer in step 58 in response to the sensed deassertion of the receive carrier, which causes the MAC 22 to wait the minimum IPG interval of 9.6 microseconds ($\mu s$) for a 10 Mbit/s network and 0.96 $\mu s$ for a 100 Mbit/s network. A similar IPG interval can be provided for a 1000 Mbit/s network.

While waiting the minimum IPG interval, the MAC 22 checks in step 60 if the carrier is detected on the media 50. If a carrier is detected in step 60, the MAC 22 returns to the wait state in step 56, causing the delay timer to be reset. If no carrier is detected during the delay interval, the MAC 22 checks in step 62 whether the transmit FIFO 32 has a data packet (P1) to send. If the transmit FIFO 32 has data to send, the MAC 22 begins to transmit the data packet in step 64.

After transmission has begun in step 64, the MAC 22 checks in step 66 to determine whether a collision has been detected. If no collision is detected in step 66, the transmission of the data packet is completed in step 68, and the process returns to step 56.

If a collision is detected in step 66, the MAC 22 performs collision mediation, shown in FIG. 2B. The collision mediation of the present invention uses a priority access algorithm for high priority traffic requiring a guaranteed latency, for example multimedia traffic or network management traffic. Specifically, the MAC 22 modifies the (TBEB) algorithm by multiplying the integer multiple of slot times by a fractional coefficient (f) corresponding to a priority of the data packet to be transmitted. According to the disclosed embodiment, the MAC 22 follows the conventional TBEB algorithm for normal-priority traffic, and high-priority traffic if the number of access attempts equals one. Hence, the MAC 22 provides an opportunity for other traffic to access the medium. On subsequent collisions, however, MAC 22 will reduce the collision delay interval for the priority traffic by multiplying the randomized number of time slots with the fractional coefficient (f).

Hence, use of the priority access algorithm grants a station having high priority data a higher probability of successfully accessing the media. The value of the fractional coefficient (f) can be varied to increase or decrease the priority level, where a lower fractional coefficient (i.e., f=1/16) increases the priority and reduces the access latency variability. Access latency is defined as the time interval when the frame is at the head of the MAC queue until successful transmission, including the transmit time on the wire. Similarly, a higher fractional coefficient (i.e., f=½) reduces the priority and increases the access latency variability. If the fractional coefficient is set equal to one (f=1), then the priority traffic uses the same TBEB algorithm as normal traffic.

Collision mediation according to the disclosed embodiment begins generally in FIG. 2B by initializing an internal collision counter in step 70 (N=0) and incrementing the collision counter in step 72. Thus, if a collision is detected in step 66 at FIG. 2A, the collision counter (N) is initially set to 1 (N=1) in step 72. The MAC 22 then checks in step 74 if the number of collisions (N) is greater than or equal to ten.

If the number of access attempts (N) is less than ten in step 74, then an exponential number of access attempts (A) is determined in step 76 according to the equation $A=2^N-1$. If in step 74 the number of collisions N is greater than or equal to ten, the MAC 22 then checks in step 78 if the number of collisions is equal to sixteen. If the number of collisions is equal to sixteen, then the frame or data packet to be transmitted is discarded in step 80 in accordance with Ethernet ((ANSI/IEEE 802.3) protocol. If N is less than 16, then the exponential number of access attempts is set in step 82 to $A=2^{10}-1$, or 1,023.

After calculating the exponential number of access attempts A, the MAC 22 randomly selects an integer value (k) in step 84 from the range between 0 and the exponential number of access attempts A having a maximum value of 1,023. The MAC 22 then checks in step 86 if the data received from the transmit FIFO 32 is priority data, for example by checking if a priority flag in the data packet is set. If the MAC 22 determines that the data to be transmitted is not priority data, the MAC 22 calculates the delay time ($t_d$) in step 88 by multiplying the predetermined slot time ($t_s$) with the randomly selected integer k. Hence, the slot time interval, also referred to as the collision delay interval ($t_d$), is calculated for non-priority data using the conventional TBEB algorithm, where the collision delay interval is equal to a randomized integer multiple (k) of time slots ($t_s$).

A slot time ($t_s$) has a duration equal to 512 bit times for 10 and 100 Mbit/s networks. Hence, a slot time will have a duration of 51.2 microseconds in a 10 megabit per second network and 5.12 microseconds in a 100 megabit per second network. The slot time ($t_s$) for a 1000 Mbit/s network is selected in accordance with the network topology and propagation delay, and preferably has a duration equal to 4096 bit times.

If in step 86 the MAC 22 determines that priority data is to be sent, the MAC 22 checks in step 90 whether the collision counter equals one (N=1). If in step 90 the collision counter equals one, the MAC 22 calculates the collision delay interval according to the conventional TBEB algorithm in step 88. Hence, the MAC 22 continues to use the conventional TBEB algorithm after the first collision to provide other network stations the opportunity to access the media. If in step 90 the collision counter does not equal one (i.e., the number of collisions is greater than one), the MAC 22 calculates the collision delay interval in step 92 by multiplying the randomized integer multiple (k) of time slots ($t_s$) with a fractional coefficient (f).

The fractional coefficient (f) has a value in the range between zero and including one ($0<f\leq 1$). The fractional coefficient (f) is proportional to the access latency variability of the data packet, and inversely proportional to the priority of the data packet. In other words, the greater the access latency variability required by the data being transmitted, the lesser the required priority. Hence the fractional coefficient (f) is the inverse of a priority coefficient (L) (i.e., f=1/L). For example, multimedia data or real-time data require a bounded access latency during data transmission with minimal access latency variability, and will require a higher priority (e.g., f=⅛). Conversely, low-priority data such as binary text data does not require a bounded access latency, and can be transmitted using a higher latency variability (e.g., f=¼). The fractional coefficient (f) is selected based on network topology, network traffic levels, the type and size of data packets transmitted on the network.

Hence, the slot time interval ($t_d$) is calculated in step 92 by multiplying the integer multiple of slot times by the fraction (f), i.e., by dividing the integer multiple of slot times with the priority coefficient (L). Consequently, a station attempting to transmit priority data will have a higher probability of winning the collision mediation than a station transmitting low priority data.

After the delay time is calculated, the MAC 22 uses the internal collision delay counter to wait in step 94 for the calculated delay time $t_d$. During the delay time $t_d$, the MAC 22 checks in step 96 whether a carrier is sensed on the media. If a receive carrier is asserted on the media, the MAC 22 resets the delay timer in step 98 and waits until deassertion of the receive carrier is sensed. Although not shown, waiting in step 98 includes waiting for at least the IPG interval after sensing deassertion of the receive carrier (see steps 56 and 58). If the carrier is not sensed in step 96, then the MAC 22 in step 100 attempts access of the media in response to the detected collision and after the slot time interval $t_d$ calculated in step 94. If a collision occurs in step 102, the process returns to step 72. If no collision is detected, then the process returns to step 68 to complete transmission.

The disclosed priority access algorithm may also be implemented by selecting one of a plurality of fractional coefficients based on the number of access attempts. For example, the coefficient (f) could be a dynamic function f(N), where f(1)=1, f(2)=¼, f(8)=⅛, f(10)=1/16, etc. Hence, use of a plurality of priority levels enables a station encountering repeated collisions to receive a greater priority ensuring a guaranteed latency.

FIG. 3 is a block diagram illustrating the functional components of the MAC 22. The media access control 22 includes a plurality of registers 120, a collision counter 122 storing the number of access attempts (N), a delay timer 124 that counts the delay, a controller 126 and a carrier sense multiple access/collision detection (CSMA/CD) portion 128. The values of IPG and $t_s$ stored in registers 120a and 120b respectively are pre-loaded in a nonvolatile memory element. The memory 120c stores the fractional coefficients (f(N)) used in step 92. The value of the fractional coefficients may be preset in a nonvolatile EPROM, programmed in the register 120c, or programmed by a management entity, for example a network administrator i.e., a second network station. The register 120d stores a priority value (P) indicating whether the data to be transmitted is priority data. The MAC selects the priority coefficient by the number of access attempts (N), and/or a plurality of corresponding priority values from the data packet to be transmitted on the media. The MAC controller 126, also referred to as a delay time calculator, calculates the delay time $t_d$, described above, and stores the resulting delay time in register 120d.

The MAC controller 126 starts the delay timer 124 in response to a signal from the CSMA/CD 128 indicating that deassertion of the receive carrier on the media has been sensed. The MAC controller 126 sends an instruction to the Manchester encoder/decoder 24 (MENDEC) to attempt access to the media after the delay timer has reached the determined delay time $t_d$ stored in register 120d.

According to the present invention, the reduction of the collision delay interval by multiplying the integer multiple of time slots with a fractional coefficient provides a network station having high priority traffic a greater probability of accessing the media during collision mediation. Hence, a half-duplex Ethernet network can transport high priority traffic requiring a guaranteed latency.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. A method in a network station of mediating collisions on network media, comprising:

sensing a collision on the media;

determining a priority of data to be transmitted by the network station;

determining a slot time interval by multiplying a predetermined slot time interval with (1) an integer randomly selected from a range of integers calculated from an exponential number of access attempts by the network station, and (2) a selected coefficient having a value corresponding to the determined priority; and attempting access of the media in response to the detected collision and after the slot time interval.

2. The method of claim 1, wherein the determining step comprises:

storing a plurality of priority coefficients as said selected coefficient in said network station, each having a unique fractional value;

reading a priority value from a data packet to be transmitted on the media; and selecting one of said priority coefficients in response to the read priority value.

3. The method of claim 2, wherein the storing step comprises receiving data packets carrying the priority coefficients from a second network station.

4. The method of claim 1, wherein the selecting step comprises selecting the coefficient based on the number of access attempts.

5. A method in a network station of mediating collisions on network media, comprising:

sensing a collision on the media;

determining a priority of data to be transmitted by the network station;

determining a slot time interval in accordance with (1) an integer randomly selected from a range of integers calculated from an exponential number of access attempts by the network station, and (2) a priority coefficient having a value corresponding to the determined priority; and attempting access of the media in response to the detected collision and after the slot time interval, wherein the determining step further comprises:

setting the priority coefficient equal to one if the number of access attempts by the network stations is one; and setting the priority coefficient to a value less than one and greater than zero if the number of access attempts by the network station is greater than one and the determined priority is a high priority.

6. The method of claim 5, wherein the network has a data rate of 10 megabits per second and a predetermined delay interval, used to calculate the slot time interval, that equals 51.2 microseconds.

7. The method of claim 5, wherein the network has a data rate of 100 megabits per second and a predetermined delay interval, used to calculate the slot time interval, that equals 5.12 microseconds.

8. The method of claim 5, wherein the network has a data rate of 1000 megabits per second and a predetermined delay interval, used to calculate the slot time interval, that has a duration equal to four thousand ninety-six (4096) bit times.

9. A method in a network station of mediating collisions on network media, comprising:

sensing a collision on the media;

determining a collision delay interval comprising:

(1) randomly selecting a first integer from a range of integers calculated from an exponential number of access attempts by a network station, (2) first determining a number of collisions encountered by the network station, (3) multiplying a predetermined slot time with the first integer to obtain an integer multiple slot time interval;

(4) if the number of collisions equals one, using the integer multiple slot time interval as the collision delay interval;

(5) second determining if data for transmission has a priority status;

(6) if the number of collisions is greater than one and the data has said priority status, multiplying the integer multiple slot time interval with a fractional coefficient to obtain the collision delay interval; and attempting access of the media following the collision delay interval after the detected collision.

10. The method of claim 9, wherein the range of integers has a maximum value of $2^{10}-1$.

11. The method of claim 10, wherein the network has a data rate of 10 megabits per second and the predetermined delay interval equals 51.2 microseconds.

12. The method of claim 10, wherein the network has a data rate of 100 megabits per second and the predetermined delay interval equals 5.12 microseconds.

13. The method of claim 10, wherein the network has a data rate of 1000 megabits per second and the predetermined delay interval has a duration equal to four thousand ninety six (4096) bit times.

14. A network interface for connection with network media, comprising:

a buffer storing data having an identified priority for transmission on the media;

a collision sensor sensing a collision on the media;

a delay time calculator selectively calculating a delay time by multiplying a selected integer multiple of slot times with a fractional coefficient in response to a number of access attempts by the network interface and the identified priority; and a media access device attempting access of the media in response to the sensed collision of the media and after said delay time.

15. The network interface of claim 14, wherein the delay time calculator calculates said delay time as said integer multiple of a predetermined delay if the identified priority is low, the integer multiple randomly selected from an integer range calculated from an exponential number of the access attempts.

16. A network interface for connection with network media, comprising:

a buffer storing data having an identified priority for transmission on the media;

a collision sensor sensing a collision on the media;

a delay time calculator selectively calculating a delay time in response to a number of access attempts by the network interface and the identified priority; and a media access device attempting access of the media in response to the sensed collision of the media and after said delay time, wherein the delay time calculator calculates said delay time as an integer multiple of a predetermined delay if the identified priority is low, the integer multiple randomly selected from an integer range calculated from an exponential number of the access attempts, wherein the delay time calculator calculates said delay time as a fraction of said integer multiple of said predetermined delay if the identified priority is low and the number of access attempts is greater than one.

17. The network interface of claim 16, further comprising a register storing said fraction.

18. The network interface of claim 14, wherein the delay time calculator selects one of a plurality of fractional values as said fractional coefficient based on the number of access attempts.

19. A method in a network station of accessing a network media, comprising:

transmitting a data packet carrying data requiring a bounded access latency;

sensing a collision on the media;

determining a collision delay interval by multiplying a predetermined delay interval with (1) an integer randomly selected from a range of integers calculated from an exponential number of access attempts by the network station, and (2) a priority coefficient having a value less than one if the number of said access attempts is greater than one; and attempting access of the media in response to the detected collision and after the collision delay interval.

20. The method of claim 19, wherein said data is multimedia data.

21. A method of limiting access latency during data transmission in a network station, comprising:

sensing a collision on a network media;

if a number of access attempts is one, determining a delay time by randomly selecting between zero and a predetermined slot time;

if the number of access attempts is greater than one, determining said delay time by (1) randomly selecting an integer, (2) multiplying the selected integer with the predetermined slot time, and (3) multiplying the selected integer multiple of slot times with a coefficient corresponding to an access latency variability; and attempting access of the media in response to the detected collision and after the determined delay time.

22. The method of claim 21, wherein the coefficient has a value of one and corresponds to an unbounded access latency.

23. The method of claim 21, wherein the coefficient has a value greater than one and corresponds to a bounded access latency.

24. The method of claim 23, wherein the coefficient has a value of eight (8).

* * * * *

UNITED STATES PATENT AND TRADEMARK OFFICE
CERTIFICATE OF CORRECTION

PATENT NO. : 5,852,723
DATED : December 22, 1998
INVENTOR(S) : Mohan KALKUNTE et al It is certified that error appears in the above-indentified patent and that said Letters Patent is hereby corrected as shown below:

Claim 2, Line 53, delete "as said selected coefficient"
Claim 2, Line 58, after "coefficients" insert --as said selected coefficient--

Signed and Sealed this

Fourteenth Day of November, 2000

Attest:

Q. TODD DICKINSON

*Attesting Officer*     *Director of Patents and Trademarks*